No. 879,336. PATENTED FEB. 18, 1908.
W. STEENKEN.
AUTOMATIC WEIGHING SCALE.
APPLICATION FILED DEC. 8, 1906.
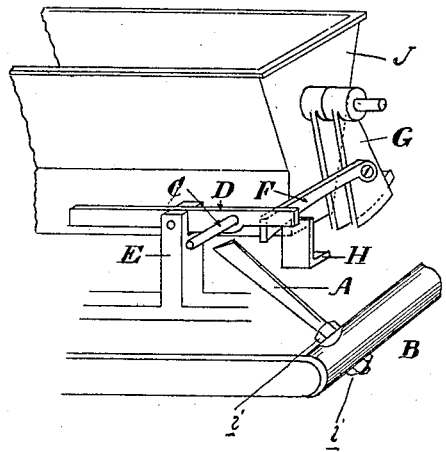
Fig. 1,
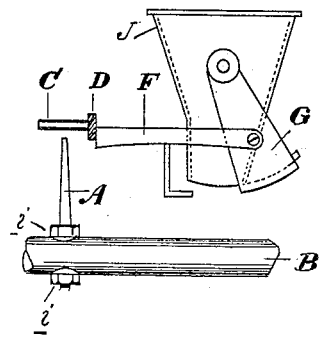
Fig. 2,

UNITED STATES PATENT OFFICE.

WILLIAM STEENKEN, OF BROOKLYN, NEW YORK, ASSIGNOR TO E. & T. FAIRBANKS & COMPANY, OF ST. JOHNSBURY, VERMONT, A CORPORATION OF VERMONT.

AUTOMATIC WEIGHING-SCALE.

No. 879,336.  Specification of Letters Patent.  Patented Feb. 18, 1908.

Application filed December 8, 1906. Serial No. 346,878.

*To all whom it may concern:*

Be it known that I, WILLIAM STEENKEN, a citizen of the United States of America, residing at Brooklyn, in the county of Kings and State of New York, United States of America, have invented certain new and useful Improvements in Automatic Weighing-Scales, of which the following is a specification, reference being had therein to the accompanying drawings.

The invention relates to new and useful improvements in automatic weighing scales, and refers particularly to an improvement upon the type of scale shown in Letters Patent of the United States No. 761,587, dated May 31, 1904, issued to George Hoepner.

It consists in the construction of an actuating device for the cut-off gate as more fully hereinafter described and particularly pointed out in the claims.

In the drawings, Figure 1 is a perspective view of the feeding hopper, showing the cut-off gate and the locking and unlocking mechanism therefor; Fig. 2 is an end elevation of the parts shown in Fig. 1.

In scales of this type there is a weighing receptacle, not shown, and which is usually a double receptacle formed by a partition in the middle, so that first one half is filled and emptied and then the second half is filled and emptied. This weighing receptacle is supported upon scale levers, of which I have indicated a portion in the part lettered B, and it is customary, as one portion of the weighing receptacle is filled, to operate the cut-off gate for the feed by the movement of the scale lever or some part of the scale; but such devices heretofore employed have not been as satisfactory or as economical as the device herein shown.

J represents the stationary feed hopper, and G the swinging cut-off gate adapted to swing across the lower end of the hopper and stop the flow of material into the receptacle at the completion of each weighing operation. Attached to this swinging gate, at one end, is a finger F, which in this case I have shown as pivoted to some portion of the cut-off gate and resting upon the bracket H.

D is a pivoted abutment, pivoted upon the bracket or standard E, and when the gate is opened this abutment is in the path of movement of the finger F so it will rest against it, as shown in Fig. 1, and prevent the gate from closing.

Upon the pivoted abutment D is a pin or lug C, which is in the path of movement of the upper end of an arm A, adjustably secured to the scale lever B. The adjustment may be effected by means of nuts $i$ upon opposite sides of the part of the scale lever through which the arm A passes.

As the weighing receptacle I lowers the outer end of the scale lever will rise and carry with it the arm A which, striking the pin C, will lift its pivoted abutment D out of the path of the finger F, when the gate G will swing across the mouth of the feeding hopper and close the same.

I have not deemed it necessary to show the devices which may be employed for opening the cut-off gate, as they have no part with my present invention; but it is obvious that when opened, the gate being moved to the right (Fig. 2) the abutment D will again drop into the path of the finger F and hold it in its open position.

What I claim as my invention is:

1. In an automatic weighing device, the combination of a movable weighing lever, a swinging cut off gate, a hinged finger thereon, a pivoted abutment against which the finger rests in the open position of the gate, a pin or lug on the pivoted abutment, and an arm on a moving part of the scale adapted to strike the pin to lift the abutment.

2. In an automatic weighing device, the combination of a movable weighing lever, an adjustable arm thereon, a cut off gate, a finger thereon, a pivoted abutment against which the finger rests in the open position of the gate, the parts being combined so that the movement of the lever as the scale is loaded causes the arm to move the abutment and permit the gate to close.

In testimony whereof I affix my signature in presence of two witnesses.

WILLIAM STEENKEN.

Witnesses:
J. HENRY LIRNAN,
WM. MÜLLER.